(12) United States Patent
Kang et al.

(10) Patent No.: US 7,659,332 B2
(45) Date of Patent: *Feb. 9, 2010

(54) FLAME RETARDANT POLYCARBONATE THERMOPLASTIC RESIN COMPOSITION HAVING GOOD EXTRUSION MOLDABILITY AND IMPACT RESISTANCE

(75) Inventors: Tae Gon Kang, Suwon-si (KR); Jong Cheol Lim, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 225 days.

This patent is subject to a terminal disclaimer.

(21) Appl. No.: 11/768,592

(22) Filed: Jun. 26, 2007

(65) Prior Publication Data

US 2007/0249767 A1 Oct. 25, 2007

Related U.S. Application Data

(63) Continuation-in-part of application No. 11/647,101, filed on Dec. 28, 2006, which is a continuation-in-part of application No. PCT/KR2006/005752, filed on Dec. 27, 2006.

(30) Foreign Application Priority Data

Dec. 30, 2005 (KR) .................. 10-2005-135569
Dec. 30, 2005 (KR) .................. 10-2005-135769

(51) Int. Cl.
*C08K 5/523* (2006.01)
*C08K 5/5399* (2006.01)

(52) U.S. Cl. .................. 524/127; 524/122; 524/138; 524/140; 524/141

(58) Field of Classification Search .................. 524/122, 524/127, 138, 140, 141
See application file for complete search history.

(56) References Cited

U.S. PATENT DOCUMENTS

| | | | |
|---|---|---|---|
| 3,839,513 A | 10/1974 | Patel | |
| 4,117,041 A | 9/1978 | Guschl | |
| 4,391,935 A | 7/1983 | Bialous et al. | |
| 4,692,488 A | 9/1987 | Kress et al. | |
| 4,883,835 A * | 11/1989 | Buysch et al. | 524/504 |
| 4,914,144 A * | 4/1990 | Muehlbach et al. | 524/139 |
| 4,918,159 A | 4/1990 | Nakamura et al. | |
| 4,988,748 A * | 1/1991 | Fuhr et al. | 524/141 |
| 5,061,745 A | 10/1991 | Wittman et al. | |
| 5,204,394 A | 4/1993 | Gosens et al. | |
| 5,206,404 A | 4/1993 | Gunkel et al. | |
| 5,219,907 A * | 6/1993 | Niessner et al. | 524/140 |
| 5,627,228 A | 5/1997 | Kobayashi | |
| 5,643,981 A | 7/1997 | Yang et al. | |
| 5,672,645 A * | 9/1997 | Eckel et al. | 524/127 |
| 5,750,602 A * | 5/1998 | Kohler et al. | 524/127 |
| 5,833,886 A | 11/1998 | Dashevsky et al. | |
| 6,083,428 A | 7/2000 | Ueda et al. | |
| 6,127,465 A | 10/2000 | Nodera | |
| 6,174,945 B1 | 1/2001 | Kim et al. | |
| 6,369,141 B1 | 4/2002 | Ishii et al. | |
| 6,437,029 B1 | 8/2002 | Lim et al. | |
| 6,528,561 B1 * | 3/2003 | Zobel et al. | 524/125 |
| 6,576,161 B2 | 6/2003 | Lim et al. | |
| 6,613,822 B1 | 9/2003 | Eckel et al. | |
| 6,613,824 B2 | 9/2003 | Campbell et al. | |
| 6,630,524 B1 | 10/2003 | Lim et al. | |
| 6,686,404 B1 | 2/2004 | Eckel et al. | |
| 6,716,900 B2 | 4/2004 | Jang et al. | |
| 6,762,228 B2 * | 7/2004 | Seidel et al. | 524/127 |
| 6,890,979 B2 * | 5/2005 | Eichenauer et al. | 524/115 |
| 6,914,089 B2 | 7/2005 | Eckel et al. | |
| 7,001,944 B2 * | 2/2006 | Vathauer et al. | 524/442 |
| 7,094,818 B2 * | 8/2006 | Lim et al. | 524/97 |
| 7,511,088 B2 * | 3/2009 | Lim et al. | 524/122 |
| 7,550,523 B2 | 6/2009 | Lim et al. | |
| 2001/0009946 A1 | 7/2001 | Catsman et al. | |
| 2002/0115759 A1 | 8/2002 | Eckel et al. | |
| 2003/0139504 A1 | 7/2003 | Miebach et al. | |
| 2004/0122139 A1 | 6/2004 | Yang et al. | |
| 2004/0192814 A1 | 9/2004 | Yang et al. | |
| 2004/0198877 A1 | 10/2004 | Yang et al. | |
| 2004/0249027 A1 | 12/2004 | Lim et al. | |
| 2004/0249070 A1 | 12/2004 | Lim et al. | |
| 2005/0245648 A1 | 11/2005 | Lim et al. | |
| 2007/0155873 A1 | 7/2007 | Kang et al. | |
| 2007/0295946 A1 | 12/2007 | Lim et al. | |
| 2008/0182926 A1 | 7/2008 | Lim et al. | |

FOREIGN PATENT DOCUMENTS

| | | |
|---|---|---|
| DE | 196 32 675 A1 | 2/1998 |
| DE | 19801198 A1 | 7/1999 |
| DE | 10061081 A1 | 6/2002 |
| EP | 0640655 A1 | 8/1994 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0909790 A1 | 4/1999 |
| EP | 0 970 997 A2 | 1/2000 |

(Continued)

OTHER PUBLICATIONS

European Search Report in commonly owned European Application No. EP 04808586, completed on Sep. 25, 2007.
International Search Report in commonly owned International Application No. PCT/KR2004/003457, mailed on Jul. 14, 2005.
International Preliminary Report on Patentability in commonly owned International Application No. PCT/KR2004/003457, dated Jan. 25, 2007.
International Search Report in counterpart International Application No. PCT/KR2006/005752, mailed on Mar. 27, 2007.
Office Action mailed Nov. 28, 2008, in commonly owned U.S. Appl. No. 11/576,172.

*Primary Examiner*—Peter Szekely
(74) *Attorney, Agent, or Firm*—Summa, Additon & Ashe, P.A.

(57) ABSTRACT

One aspect of the invention relates to a flame retardant thermoplastic resin composition. The invention also relates to a method of making the foregoing composition and an article made from the foregoing composition.

18 Claims, No Drawings

FOREIGN PATENT DOCUMENTS

| | | | |
|---|---|---|---|
| EP | 1069154 A | 1/2001 |
| EP | 1209163 A1 | 5/2002 |
| JP | 59-149912 | 8/1984 |
| JP | 59-202240 | 11/1984 |
| JP | 61 00785 | 1/1994 |
| JP | 08012868 A | 1/1996 |
| JP | 09/053009 | 2/1997 |
| JP | 2000-154277 A1 | 6/2000 |
| JP | 2001316580 A | 11/2001 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 1020000041993 A | 7/2000 |
| KR | 10-2000-0055347 A | 9/2000 |
| KR | 2001 109044 A1 | 12/2001 |
| KR | 2002 6350 A1 | 1/2002 |
| KR | 100360710 B | 10/2002 |
| KR | 2002-83711 A1 | 11/2002 |
| KR | 2001-107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| WO | 99 19383 A1 | 4/1999 |
| WO | 99/57198 A1 | 11/1999 |
| WO | 00/00544 A1 | 1/2000 |
| WO | 00 09518 A1 | 2/2000 |
| WO | 00/18844 A1 | 4/2000 |
| WO | 01/06634 A1 | 9/2001 |
| WO | 02/46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006-041237 A1 | 4/2006 |

\* cited by examiner

FLAME RETARDANT POLYCARBONATE THERMOPLASTIC RESIN COMPOSITION HAVING GOOD EXTRUSION MOLDABILITY AND IMPACT RESISTANCE

CROSS-REFERENCE TO RELATED APPLICATIONS

This application is a continuation-in-part application of pending U.S. application Ser. No. 11/647,101, filed Dec. 28, 2006, which is hereby incorporated by reference in its entirety and which claims the benefit under 35 U.S.C. § 119(a)-(d) of Korean Application No. 10-2005-135569 filed Dec. 30, 2005, also incorporated herein by reference in its entirety. This application is also a continuation-in-part application of PCT Application No. PCT/KR2006/005752, filed Dec. 27, 2006, pending, which designates the U.S. and claims priority from Korean Patent Application No. 10-2005-135569, filed Dec. 30, 2005, and Korean Patent Application No. 10-2005-135769, filed Dec. 30, 2005, the entire disclosure of each of which is also incorporated herein by reference in its entirety.

BACKGROUND

1. Field

The present invention relates to a flame retardant polycarbonate thermoplastic resin composition which is excellent in extrusion moldability and impact resistance.

2. Discussion of Related Technology

A blend of a polycarbonate resin and a styrene-containing copolymer can be a resin composition with improved processability and good notched impact strength. It can be desirable for this resin composition to have good flame retardancy and heat resistance as well as high mechanical strength. This resin composition can be applied to heat-emitting big-size injection molding products such as computer housings, office supplies, etc. The foregoing discussion in this section is solely to proved background information and does not constitute an admission or prior art.

SUMMARY

One aspect of the invention relates to a flame retardant thermoplastic resin composition. According to embodiments, the thermoplastic resin composition can comprise about 45 to about 95 parts by weight of a polycarbonate resin, about 1 to about 50 parts by weight of a rubber modified vinyl graft copolymer, about 1 to about 50 parts by weight of a nonlinear vinyl copolymer group. The thermoplastic resin composition can further comprise about 1 to about 30 parts by weight, with reference to 100 parts by weight of the combined weight of the polycarbonate resin, the rubber modified vinyl graft copolymer and the nonlinear vinyl copolymer group, of a phosphorous compound and about 0.05 to about 5 parts by weight, with reference to 100 parts by weight of the combined weight of the polycarbonate resin, the rubber modified vinyl graft copolymer and the nonlinear vinyl copolymer group, of a fluorinated polyolefin resin.

Another aspect of the invention relates to a method of preparing the foregoing flame retardant thermoplastic resin composition. According to embodiments, this method comprises providing the components of the polycarbonate resin composition described above and mixing the components.

Another aspect of the invention relates to a molded article made from the foregoing flame retardant thermoplastic resin composition. In some embodiments, molded articles made from the flame retardant thermoplastic resin composition described above can be suitable for use in a variety of applications such as household goods, computer housings and office supplies.

DETAILED DESCRIPTION OF EMBODIMENTS

As noted above, one aspect of the invention relates to a flame retardant thermoplastic resin composition. The thermoplastic resin composition can comprise polycarbonate resin, rubber modified vinyl graft copolymer, a nonlinear vinyl copolymer group, a phosphorous compound and a fluorinated polyolefin resin. Optionally, the thermoplastic resin composition can further comprise one or more additives such as flame retardant aids, lubricants, releasing agents, nucleating agents, antistatic agents, stabilizers, impact modifiers, inorganic fillers, pigments or dyes. The relative amounts of the flame retardant thermoplastic resin composition components can vary. The relative amounts of the polycarbonate resin, the rubber modified vinyl graft copolymer and the nonlinear vinyl copolymer group will be described with reference to each other. The amount of the phosphorous compound and the amount of the fluorinated polyolefin resin will each be described with reference to 100 parts by weight of the combined weight of the polycarbonate resin, the rubber modified vinyl graft copolymer and the nonlinear vinyl copolymer group.

Another aspect of the invention relates to a method of preparing the foregoing thermoplastic resin composition. An additional aspect of the invention relates to a molded article formed from the foregoing thermoplastic resin composition. In one embodiment, a molded article formed from the foregoing flame retardant thermoplastic resin composition can have a notch Izod impact strength of at least about 35 (kgfcm/cm) when specimens having ¼" thickness kept at a humidity of 90% at 60° C. for 24 hours are evaluated in accordance with ASTM D256(¼" notched), a melt flow index of between about 5 and about 35 when specimens are measure in accordance with ASTM D1238 at 250° C., under 10 kg load, a flame retardancy of about V-0 or V-1 when specimens having a thickness of 1.5 mm are evaluated in accordance with UL94, and good sagging resistance, breaking resistance, and workability when specimens are extruded. A more detailed description of each of the components of the resin composition according to various embodiments follows.

Polycarbonate Resin

In various embodiments, the polycarbonate resin can comprise homopolymers or copolymers having functional groups linked together by carbonate groups. According to embodiments, examples include polyaromatic carbonates, polyaliphatic carbonates and mixtures thereof. The polycarbonate resins can be branched or can be linear.

According to embodiments, the polycarbonate resin can be prepared by reacting a diphenol represented by the following formula (I) with a phosgene, a halogen formate or a carboxylic acid diester:

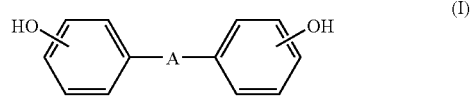

wherein A is a single bond, a $C_{1-5}$ alkylene group, a $C_{1-5}$ alkylidene group, a $C_{5-6}$ cycloalkylidene group, S or $SO_2$.

The examples of the diphenol include hydroquinone, resorcinol, 4,4'-dihydroxydiphenyl, 2,2-bis-(4-hydroxyphenyl)- propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, and 2,2-bis-(3,5-dichloro-4-hydroxyphenyl)-propane. Preferable diphenols are 2,2-bis-(4-hydroxyphenyl)-propane, 2,2-bis-(3,5-dichloro-4-hydroxyphenyl)-propane, 1,1-bis-(4-hydroxyphenyl)-cyclohexane and 2,2-bis-(4-hydroxyphenyl)-propane called 'bisphenol A'. Preferably, the polycarbonate resin has a weight average molecular weight ($M_w$) of about 10,000 to about 200,000, more preferably from about 15,000 to about 80,000.

According to embodiments, suitable polycarbonates incorporated into the composition of the present invention may be branched in a known manner. For example, such branched polycarbonates can be prepared by incorporating 0.05 to 2 mol %, based on the total quantity of diphenols used, of tri- or higher functional compounds, for example, those with three or more phenolic groups.

According to embodiments, some portion of the polycarbonate resin may be replaced with an aromatic polyester-carbonate resin that is obtained by polymerization in the presence of an ester precursor, such as a difunctional carboxylic acid.

In various embodiments, the polycarbonate resin can comprise about 35, 45, 55, 65, 75, 85 or 95 parts by weight with reference to the weight of the rubber modified vinyl graft copolymer or the nonlinear vinyl copolymer group. In addition, the polycarbonate resin can comprise an amount in a range from about any of the foregoing amounts to any of the other foregoing amounts.

Rubber Modified Vinyl Graft Copolymer

In various embodiments, the rubber modified vinyl graft copolymer can comprise a rubber polymer grafted with polymer or copolymer side chains.

According to embodiments, examples of the rubber polymer include butadiene rubber, acryl rubber, ethylene-propylene rubber, styrene-butadiene rubber, acrylonitrile-butadiene rubber, isoprene rubber, terpolymer of ethylene-propylene-diene (EPDM), polyorganosiloxane-polyalkyl (meth)acrylate rubber complex and a mixtures thereof.

According to embodiments, the rubber polymer can have an average particle size of about 0.05 to about 4 µm.

In some embodiments, the rubber polymer can comprise about 5, 10, 20, 30, 40, 50, 60, 70, 80, 90 or 95 parts by weight with reference to 100 parts by weight of the rubber modified vinyl graft copolymer. In addition, the rubber polymer can comprise an amount in a range from about any of the foregoing numbers to any of the other foregoing numbers.

The polymer or copolymer side chains can be grafted onto the rubber polymer by methods known in the art. Various polymerization techniques can be used including emulsion polymerization, bulk polymerization, emulsion-suspension polymerization, emulsion-bulk polymerization, emulsion-solution polymerization and micro-suspension polymerization.

The side chains can comprise polymer or copolymer moieties or chains attached to the rubber particles or cores. The polymer or copolymer side chains can be prepared by polymerizing a monomer mixture. According to embodiments, the polymer or copolymer side chains can be prepared from a monomer mixture comprising about 50 to about 95 parts by weight, with reference to 100 parts by weight of the monomer mixture, of styrene, α-methylstyrene, halogen- or alkyl-substituted styrene, $C_{1-8}$ methacrylic acid alkyl ester, $C_{1-8}$ acrylic acid alkyl ester, or a mixture thereof, and about 5 to about 50 parts by weight, with reference to 100 parts by weight of a monomer mixture, of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof.

The $C_{1-8}$ methacrylic acid alkyl ester or the $C_{1-8}$ acrylic alkyl ester are esters of methacrylic acid or acrylic acid respectively from monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester. Among them, methacrylic acid methyl ester is the most preferable.

Preferable examples of the rubber modified vinyl graft copolymer are grafted-copolymers obtained by graft polymerizing a mixture of styrene, acrylonitrile, and optionally (meth)acrylic acid alkyl ester onto butadiene rubber, acryl rubber, or styrene-butadiene rubber. Other preferable examples of the rubber modified vinyl graft copolymer are grafted-copolymers obtained by graft polymerizing (meth)acrylic acid alkyl ester onto butadiene rubber, acryl rubber, or styrene-butadiene rubber. The most preferable example of the rubber modified vinyl graft copolymer is an acrylonitrile-butadiene-styrene (ABS) or a MBS copolymer.

In various embodiments, the rubber modified vinyl graft copolymer can comprise about 1, 5, 10, 15, 20, 25, 30, 35, 40, 45, 50, 55 or 60 parts by weight with reference to the weight of the polycarbonate resin or the nonlinear vinyl copolymer group. In addition, the rubber modified vinyl graft copolymer can comprise an amount in a range from about any of the foregoing amounts to about any of the other foregoing amounts.

Nonlinear Vinyl Copolymer Group

According to embodiments, the nonlinear vinyl copolymer group can comprise a group of branched vinyl polymers or copolymers.

The branched polymers or copolymers of the nonlinear vinyl copolymer group can be prepared by polymerizing a monomer mixture comprising styrene, substituted styrene compounds such as α-methylstyrene, p-methylstyrene, vinyltoluene, 2,4-dimethylstyrene α-methylstyrene, halogen- or alkyl-substituted styrene, $C_{1-8}$ methacrylic acid alkyl ester, $C_{1-8}$ acrylic acid alkyl ester, acrylonitrile, methacrylonitrile, maleic anhydride, $C_{1-4}$ alkyl- or phenyl N-substituted maleimide or a mixture thereof in the presence of polyfunctional compound.

The $C_{1-8}$ methacrylic acid alkyl ester or $C_{1-8}$ acrylic acid alkyl ester can be an ester of methacrylic acid or acrylic acid respectively from monohydric alcohol with 1 to 8 carbon atoms. The examples of the acid alkyl ester include methacrylic acid methyl ester, methacrylic acid ethyl ester, acrylic acid ethyl ester, acrylic acid methyl ester and methacrylic acid propyl ester.

The polyfunctional compound may be selected from the group consisting of polyfunctional mercaptan, polyfunctional vinyl benzene compound and a mixture thereof.

The polyfunctional mercaptan may be a compound having more than three —SH groups, such as three functional mercaptan compound and four functional mercaptan compound. Examples of three functional mercaptan compounds include trimethylolpropane tris(3-mercaptopropionate), trimethylolpropane tris(3-mercaptoacetate), trimethylolpropane tris(4-mercaptobutanate), trimethylolpropane tris(5-mercaptopentanate), and trimethylolpropane tris(6-mercaptohexanoate). Examples of four functional mercaptan compounds include pentaerythritol tetrakis(2-mercaptoacetate), pentaerythritol tetrakis(3-mercaptopropionate), pentaerythritol tetrakis(4- mercaptobutanate), pentaerythritol tetrakis(5-mercaptopentanate), and pentaerythritol tetrakis(6-mercaptohexanate). According to embodiments, the polyfunctional mercaptan can be used alone or in combination with each other.

One non-limiting example of the polyfunctional vinyl benzene compound is divinylbenzene. The polyfunctional vinyl benzene compound can be used in combination with the polyfunctional mercaptan.

Polymerizing the monomer mixture comprising one or more of the foregoing compounds in the presence of one or more of the foregoing polyfunctional groups can result in branched polymer moieties comprising polymerized monomer units, copolymerized monomer units, and mixtures thereof. The branched copolymer moieties can comprise branched block copolymers, branched alternating copolymers and branched random copolymers.

The monomer mixture can be polymerized using techniques known in the art including emulsion polymerization, bulk polymerization, emulsion-suspension polymerization, emulsion-bulk polymerization, emulsion-suspension polymerization and micro-suspension polymerization.

According to embodiments, the monomer mixture can comprise about 50 to about 95 parts by weight, with reference to 100 parts by weight of the monomer mixture, of styrene, p-methylstyrene, vinyltoluene, 2,4-dimethylstyrene α-methylstyrene, α-methylstyrene, halogen- or alkyl-substituted styrene, $C_{1-8}$ methacrylic acid alkyl ester, $C_{1-8}$ acrylic acid alkyl ester, or a mixture thereof and about 5 to about 50 parts by weight of acrylonitrile, methacrylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide or a mixture thereof and a polyfunctional compound. The polyfunctional compound may be selected from the group consisting of polyfunctional mercaptan, polyfunctional vinyl benzene compound and a mixture thereof. The polyfunctional mercaptan can comprise about 0.01 to about 5 parts by weight, with reference to 100 parts by weight of the monomer mixture. The polyfunctional vinyl benzene compound can comprise about 0.005 to about 5 parts by weight, with reference to 100 parts by weight of the monomer mixture.

The nonlinear vinyl copolymer group can comprise a weight average molecular weight of about 100,000, 200,000, 500,000, 1,000,000, 1,500,000, 2,000,000, 2,500,000, 3,000,000, 3,500,000, 4,000,000, 4,500,000, 5,000,000, 5,500,000 or 6,000,000. In addition the vinyl copolymer group of the present invention can comprise a weight average molecular weight in the range of about any of the foregoing amounts to any other of the foregoing amounts.

According to various embodiments, the nonlinear vinyl copolymer group can comprise about 1, 5, 10, 15, 20, 25, 30, 35, 40, 45, 50, 55 or 60 part by weight with reference to the weight of the polycarbonate resin or the rubber modified vinyl graft copolymer. In addition, the nonlinear vinyl copolymer group can comprise an amount in a range from about any of the foregoing amounts to about any of the other foregoing amounts.

Phosphorous Compound

According to embodiments, the phosphorous compound of the present invention can be a bisphenol A-derived oligomeric phosphoric acid ester compound, a resorcinol-derived oligomeric phosphoric acid ester compound, a cyclic oligomeric phosphazene compound or a mixture thereof.

In one embodiment, the phosphorous compound is a mixture of oligomeric phosphoric acid ester compounds. In one embodiment, the phosphorous compound is a mixture of the bisphenol A-derived oligomeric phosphoric acid ester compound and the resorcinol-derived oligomeric phosphoric acid ester compound. In an embodiment, the mixture comprises about 5 to about 99 parts by weight of the bisphenol A-derived oligomeric phosphoric acid ester compound and about 1 to about 95 parts by weight of the resorcinol-derived oligomeric phosphoric acid ester compound. Preferably, the mixture comprises about 10 to about 95 parts by weight of the bisphenol A-derived oligomeric phosphoric acid ester compound and about 5 to about 90 parts by weight of the resorcinol-derived oligomeric phosphoric acid ester compound.

According to embodiments, the bisphenol A-derived oligomeric phosphoric acid ester compound can be a oligomeric phosphoric acid ester compound derived from bisphenol A represented by Formula (II). The bisphenol A-derived oligomeric phosphoric acid ester compound may be used in single or in combination as a mixture.

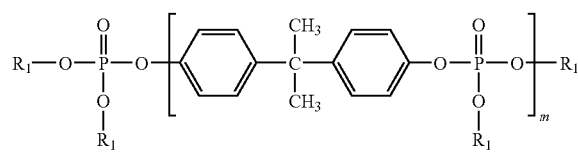

(II)

wherein $R_1$ is $C_{6-20}$ aryl group or an alkyl-substituted $C_{6-20}$ aryl group, and m is an integer representing the number of repeating units of 1 to 5. The average value of m in the mixture of the bisphenol A-derived oligomeric phosphoric acid ester can be 1 to 3.

Preferably, $R_1$ is a phenyl group, a naphthalene group, an alkyl-substituted phenyl group, or an alkyl-substituted naphthalene group where alkyl may be methyl, ethyl, propyl, isopropyl, butyl, sec-butyl, t-butyl, isobutyl, isoamyl, t-amyl and etc. Among them, a phenyl group, a naphthalene group, or an alkyl-substituted phenyl group in which alkyl is methyl, ethyl, isopropyl and t-butyl are preferred.

The oligomeric phosphoric acid ester compound of formula (II) can be derived from bisphenol A and can have an average value of m of about 1 to about 5. The bisphenol A-derived oligomeric phosphoric acid ester compound having different m values can be used by itself or as a mixture of other bisphenol A derived oligomeric phosphoric acid ester compounds thereof, which is prepared in the course of polymerization, or which is formulated with independent phosphates having different m values.

According to embodiments, the resorcinol-derived oligomeric phosphoric acid ester compound can be a oligomeric phosphoric acid ester compound derived from resorcinol (D-2) represented by Formula (III). The resorcinol-derived oligomeric phosphoric acid ester compound may be used in single or in combination as a mixture.

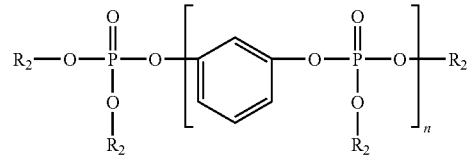

(III)

wherein $R_2$ is $C_{6-20}$ aryl group or an alkyl-substituted $C_{6-20}$ aryl group, and n is an integer representing the number of repeating units of 1 to 5. The average value of n in the mixture of the resorcinol-derived oligomeric phosphoric acid ester can be 1 to 3.

Preferably, $R_2$ is a phenyl group, a naphthalene group, an alkyl-substituted phenyl group, or an alkyl-substituted naphthalene group where alkyl may be methyl, ethyl, propyl, isopropyl, butyl, sec-butyl, t-butyl, isobutyl, isoamyl or t-amyl. Among them, a phenyl group, a naphthalene group, or an alkyl-substituted phenyl group in which alkyl is methyl, ethyl, isopropyl and t-butyl are preferred.

The oligomeric phosphoric acid ester compound of formula (III) can be derived from resorcinol and can have an average value of n of 1 to 3. The resorcinol-derived oligomeric phosphate having different n values can be used by itself or as a mixture of other resorcinol derived oligomaeric phophates, which is prepared in the course of polymerization, or which is formulated with independent phosphates having different n values.

According to embodiments, the cyclic oligomeric phosphazene compound according to the present invention can be represented by Formula (IV) in which cyclic phosphazenes are linked by $R_4$ group. The cyclic oligomeric phosphazene compound may be used in single or in combination as a mixture.

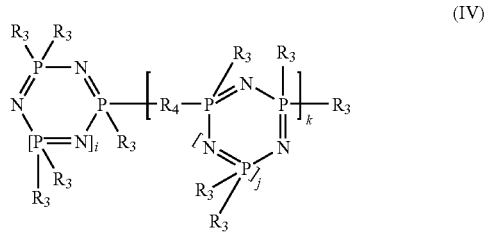

(IV)

wherein $R_3$ is alkyl, aryl, alkyl substituted aryl, arylakyl, alkoxy, aryloxy, amino, phenoxy or hydroxyl; i and j are integers from 0 to 10; $R_4$ is $C_{6-30}$ dioxyaryl or alkyl substituted $C_{6-30}$ dioxyaryl derivative; and k is a degree of polymerization and the average value of k is from 0.3 to 3.

The alkoxy or the aryloxy can be substituted with alkyl, aryl, amino, or hydroxy group.

The oligomeric cyclic phosphazene with a number average degree of polymerization of k in Formula (IV) can be obtained, when (k+1) cyclic phosphazenes monomers are linked.

It is preferable that the mixture of cyclic phosphazene oligomer has a number average degree of polymerization k of about 0.3 to about 3.

The cyclic oligomeric phosphazene compound having k value of 0 to 10 can be used by itself or as a mixture of other cyclic oligomeric phosphazene compounds, which is prepared in the course of polymerization, or which is formulated with independent cyclic oligomeric phosphazene compounds having different k values.

The cyclic oligomeric phosphazene compound may be a linear or have a branched chain.

The cyclic oligomeric phosphazene compounds having different $R_3$ groups may be used in combination of two or more.

The preferable groups of $R_4$ are a derivative from catechol, resorcinol, hydroquinone, or the bisphenylenediol of the following Formula (V):

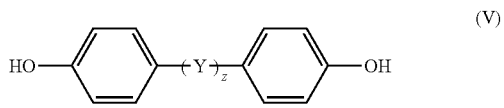

(V)

wherein Y is alkylene of $C_{1-5}$, alkylidene of $C_{1-5}$, cycloalkylidene of $C_{5-6}$, S or $SO_2$, and z is 0 or 1.

According to embodiments, the cyclic oligomeric phosphazene can be prepared through a conventional method that is not limited. The following example is solely for illustrative purposes and is not intended to limit the scope of the invention. According to one example, an alkali metal alkylate or alkali metal arylate was prepared by the reaction of alkyl alcohol or aryl alcohol with alkali metal hydroxide such as sodium hydroxide and lithium hydroxide. In the same manner, diol with $R_2$ group was reacted with alkali metal hydroxide to prepare alkali metal diarylate. Cyclic dichlorophosphazene was reacted with a mixture of the alkali metal alkylate or alkali metal arylate and the alkali metal diarylate, and the resulting solution was further reacted with the alkali metal alkylate or alkali metal arylate to obtain a cyclic oligomeric phosphazene.

In various embodiments, the phosphorous compound can comprise about 1, 5, 10, 15, 20, 25, 30, 35 of 40 parts be weight with reference to the combined weight of the polycarbonate resin, the rubber modified vinyl graft copolymer and the nonlinear vinyl copolymer group. In addition, the phosphorous compound can comprise an amount in a range from about any of the foregoing amounts to about any of the other foregoing amounts.

Fluorinated Polyolefin Resin

According to embodiments, the fluorinated polyolefin resin can comprise branched or linear polyalkene polymer or copolymer moieties or chains with one or more substituted fluorine groups. According to embodiments, the fluorine group can be bonded to the molecules in the polymer or copolymer moiety or chain, or, alternatively, can be bonded to the molecules in any branches present in the polymer or copolymer moiety or chain.

According to embodiments, the fluorinated polyolefin resin can be used in an emulsive or powder state. In addition, according to embodiments, the fluorinated polyolefin resin can have an average particle size in a range from between about 0.05 and about 1,000 µm and a density in a range from between about 1.2 and about 2.3 g/cm³.

The fluorinated polyolefin resin can be prepared via polymerization techniques known in the art including, but not limited to, emulsion polymerization, bulk polymerization, emulsion-polymerization, bulk polymerization, emulsion-suspension polymerization, emulsion-bulk polymerization, emulsion-solution polymerization and micro-suspension polymerization. According to embodiments, the fluorinated polyolefin resin can be prepared in an aqueous medium under a pressure of between about 7 and about 71 kg/cm² at a temperature of between about 0 and about 200° C., in the presence of a free radical-forming catalyst such as sodium, potassium or ammonium peroxydisulfate.

Examples of fluorinated polyolefin resins include, but are not limited to, polytetrafluoroethylene, polyvinylidenefluoride, tetrafluoroethylene/vinylidenefluoride copolymers, tetrafluoroethylene/hexafluoropropylene copolymers, and ethylene/tetrafluoroethylene copolymers. These resins may be used individually or in combinations.

In various embodiments, the fluorinated polyolefin resin can comprise about 0.01, 0.05, 0.1, 0.5, 1, 2, 3, 4, 5, 6 or 7 parts by weight with reference to 100 parts by weight of the combined weight of the polycarbonate resin, the rubber modified vinyl graft copolymer and the nonlinear vinyl copolymer group Optional Additives Other additives may be contained in the resin composition of the present invention. The additives include flame retardant aids, lubricants, releasing agents, nucleating agents, antistatic agents, stabilizers, impact modifiers, inorganic fillers, pigments or dyes and the likes.

In some embodiments, the optional additives can comprise about 1, 5, 10, 20, 30, 40, 50 or 60 parts be weight with reference to 100 parts by weight of the combined weight of the polycarbonate resin, the rubber modified vinyl graft copolymer and the nonlinear vinyl copolymer group. In addition, the optional additives can comprise an amount in a range from about any of the foregoing amounts to any of the other foregoing amounts.

Preparing the Flame Retardant Thermoplastic Resin Composition

As described above, another aspect of the present invention relates to a method of preparing the foregoing flame retardant thermoplastic resin composition. This method includes providing a polycarbonate resin; providing a rubber modified vinyl graft copolymer; providing a nonlinear vinyl copolymer group; providing a phosphorous compound; providing a fluorinated polyolefin resin; and mixing the polycarbonate resin, the rubber modified vinyl graft copolymer, the nonlinear vinyl copolymer group, the phosphorous compound and the fluorinated polyolefin resin. The method can further include other steps such as providing other additives such as flame retardant aids, lubricants, releasing agents, nucleating agents, antistatic agents, stabilizers, impact modifiers, inorganic fillers, pigments or dyes. In addition, the method can include the step of molding the resin composition into a shape.

According to some embodiments of the present invention, the above components are mixed together all at once. Alternatively, one or more of the components can be added individually.

Formulating and mixing the components can be accomplished by any method known to person having ordinary skill in the art. The mixing may occur in a pre-mixing state in a device such as a ribbon blender, followed by further mixing in a Henshel mixer, Banbury mixer, a single screw extruder, a twin screw extruder, a multi screw extruder or a cokneader.

Articles Made from the Flame Retardant Thermoplastic Resin

As described above, another aspect of the present invention relates to articles made from the foregoing flame retardant thermoplastic resin composition embodiments. The resin composition can be extruded or can be molded using various moldings such as a mold box or a melt-molding device. Further, in some embodiments of the present invention, the thermoplastic resin composition can be formed into pellets. According to some embodiments, the pellets can then be molded into various shapes using, for example, injection molding, injection compression molding, extrusion molding, blow molding, pressing, vacuum forming or foaming. In some embodiments, the resin composition can be made into pellets using a melt-kneader.

In various embodiments, the thermoplastic resin composition can be formed into various structural parts. In some embodiments, the resin composition can be formed into pipes, profiles, sheets, blow molding goods, electronic component housing and office supplies. These examples are merely illustrative and are not limiting. The thermoplastic resin composition can be applied to a variety of structural applications including structural applications requiring good flame retardancy, high impact strength and high melt viscosity.

In some embodiments, at least a portion of a molded article formed from the foregoing resin composition can have a notch Izod impact of at least about 30, 33, 35, 38 or 40 (kgfcm/cm) when specimens having ¼" thickness kept at a humidity of 90% at 60° C. for 24 hours are evaluated in accordance with ASTM D256 (¼" notched).

In some embodiments, at least a portion of a molded article formed from the foregoing resin composition can have a melt flow index of about 5, 10, 15, 20, 25, 30, 35 or an amount in a range from about any of the foregoing amount to about any of the other foregoing amounts when specimens are measure in accordance with ASTM D1238 at 250° C., under 10 kg load.

In some embodiments, at least a portion of a molded article formed from the foregoing resin composition can have a flame retardancy of about V-0 or V-1 when specimens having a thickness of 1.5 mm are evaluated in accordance with UL94.

In some embodiments, the resin composition exhibits good sagging resistance, breaking resistance, and workability when specimens are extruded.

The invention may be better understood by reference to the following examples that are intended for the purpose of illustration and are not to be construed as in any way limiting the scope of the invention. In the following examples, all parts and percentage are by weight unless otherwise indicated.

EXAMPLES

The components of the examples were prepared in the following fashion:

Preparation of the Polycarbonate Resin (A-1) Bisphenol-A based linear polycarbonate with a weight average molecular weight ($M_w$) of about 28,000 was used.

(A-2) Branched polycarbonate with a weight average molecular weight ($M_w$) of about 30,000 was used.

Preparation of the Rubber Modified Vinyl-Grafted Copolymer (B-1) 58 parts of butadiene rubber latex, 29 parts of styrene, 13 parts of acrylonitrile, and 150 parts of deionized water were mixed. To the mixture, 1.0 parts of potassium oleate, 0.4 parts of cumenhydroperoxide, and 0.3 parts of mercaptan chain transfer agent were added. The mixture was kept at 75° C. for 5 hours to obtain ABS latex. To the ABS latex, 1% sulfuric acid was added, coagulated and dried to obtain styrene-containing graft copolymer resin (g-ABS) in powder form.

(B-2) A graft copolymer of C223A (product name) by MRC Dupont Company was used, in which methacrylic acid methyl ester monomers are grafted onto butadiene rubber.

Preparation of the Nonlinear Vinyl Copolymer Group (C) 71 parts of styrene, 29 parts of acrylonitrile, 150 parts of ion-exchanged water, 0.5 parts by weight of tripotassium phosphate, 0.3 parts by weight of trimethylolpropane tris(3-mercaptopropionate), 0.5 parts by weight of divinylbenzene, and 0.3 parts by weight of 2,2'-azobisisobutylonitrile (AIBN) were added to a stainless autoclave reactor equipped with an agitator and the reactor was sealed, followed by sufficient agitation to disperse the mixture. Then the inner temperature of the reactor was elevated to 70° C. to proceed with polymerization reaction for 5 hours. Thereafter the reactor was cooled to room temperature to terminate the reaction. The resultant was washed, dehydrated and dried to obtain the nonlinear vinyl copolymer group in a bead form.

Preparation of the Linear Vinyl Copolymer Group (C') 71 parts of styrene, 29 parts of acrylonitrile and 120 parts of deionized water were mixed. To the mixture, 0.17 parts of azobisisobutylonitrile (AIBN), 0.4 parts of t-dodecyl mercaptan chain transfer agent and 0.5 parts of tricalcium-phosphate were added. The resultant solution was suspension polymerized at 75° C. for 5 hours. The resultant was washed, dehydrated and dried. Styrene-acrylonitrile copolymer (SAN) in powder state was used.

Preparation of the Phosphorous Compound (D-1) Bisphenol A Derived Oligomeric Phosphoric Acid Ester Compound The bisphenol-A derived oligomeric phosphoric acid ester represented by the chemical Formula (II) is used, where $R_1$ is a phenyl group, which consists of 3.4% by weight of the compound of m=0, 85.4% by weight of the compound of m=1, and 11.1% by weight of the compound of m=2, and which has an average of m=1.08. The phosphoric acid ester is manufactured by Daihachi Co. of Japan as CR-741 (product name).

(D-2) Resorcinol Derived Oligomeric Phosphoric Acid Ester Compound

The resorcinol derived oligomeric phosphoric acid ester represented by the chemical Formula (III) where $R_2$ is a methyl-substituted phenyl group is used, which is manufactured by Daihachi Co. of Japan as PX-200 (product name).

(D-3) Cyclic Oligomeric Phosphazene Compound

The cyclic phosphazene oligomer was used as a mixture of: 66.5% by weight of an oligomer of Formula (II) in which $R_3$ is phenoxy, i and j are 1 or 2, and k is 0; 20.3% by weight of an oligomer of Formula (II) in which $R_3$ is phenoxy, $R_4$ is a derivative from resorcinol, i and j are 1 or 2, and k is 1; 4.9% by weight of an oligomer of Formula (II) in which $R_3$ is phenoxy, $R_4$ is a derivative from resorcinol, i and j are 1 or 2, and k is 2; and 8.3% by weight of an oligomer of Formula (II) in which $R_3$ is phenoxy, $R_4$ is a derivative from resorcinol, i and j are 1 or 2, and k is 3 or more.

Preparation of the Fluorinated Polyolefin Resin (E) Teflon (registered trademark) 7AJ by Dupont company was used.

Examples 1-7

The components as shown in Table 1 in addition to an antioxidant and a heat stabilizer were added in a conventional mixer and the mixture was extruded through a twin screw extruder with L/D=35 and Φ=45 mm to prepare a product in pellet form. The resin pellets were dried at 80° C. for more than 5 hours and then molded into test specimens for measuring flame retardancy and other properties using a 10 oz injection molding machine at 240° C. to 280° C.

Examples 8-10

The components as shown in Table 3 in addition to an antioxidant and a heat stabilizer were added in a conventional mixer and the mixture was extruded through a twin screw extruder with L/D=35 and Φ=45 mm to prepare a product in pellet form. The resin pellets were dried at 80° C. for more than 5 hours and then molded into test specimens for measuring flame retardancy and other properties using a 10 oz injection molding machine at 240° C. to 280° C.

Comparative Examples 1

Comparative Example 1 was prepared in the same manner as in Example 1 except that the linear vinyl copolymer group (C') was used instead of the nonlinear vinyl copolymer group (C).

Comparative Examples 2

Comparative Example 2 was prepared in the same manner as in Example 2 except that the linear vinyl copolymer group (C') was used instead of the nonlinear vinyl copolymer group (C).

Comparative Examples 3

Comparative Example 3 was prepared in the same manner as in Example 6 except that linear vinyl copolymer group (C') was used instead of the nonlinear vinyl copolymer group (C).

Comparative Examples 4

Comparative Example 4 was prepared in the same manner as in Example 4 except that the linear vinyl copolymer group (C') was used instead of the nonlinear vinyl copolymer group (C), and the branched polycarbonate (A-2) was used instead of the linear polycarbonate (A-1).

Comparative Examples 5

Comparative Example 5 was prepared in the same manner as in Example 5 except that the linear vinyl copolymer group (C') was used instead of the nonlinear vinyl copolymer group (C), and the branched polycarbonate (A-2) was used instead of the linear polycarbonate (A-1).

Comparative Examples 6

Comparative Example 6 was prepared in the same manner as in Example 2 except that the linear vinyl copolymer group (C') was used instead of the nonlinear vinyl copolymer group (C), and the branched polycarbonate (A-2) was used instead of the linear polycarbonate (A-1).

Comparative Examples 7

Comparative Example 7 was prepared in the same manner as in Example 6 except that the linear vinyl copolymer group (C') was used instead of the nonlinear vinyl copolymer group (C), and the amount of the phosphorous compound was reduced.

Physical Properties

The specimens were kept at the relative humidity of 50% at 23° C. for 48 hours. The physical properties were measured in accordance with ASTM regulations. The results are shown in Tables 1, 2, and 3.

(1) Notch Izod Impact Strength

The notch Izod impact strength was measured in accordance with ASTM D256 (¼", ⅛" notched). The specimens having ¼" or ⅛" thickness were kept at a humidity of 90% at 60° C. for 24 hours, and measured for the notch Izod impact strength after annealing.

(2) Melt Flow Index

The melt flow index was measured in accordance with ASTM D1238 at 250° C., under 10 kg load.

(3) Flame Retardancy

The flame retardancy was measured in accordance with UL94. The test specimens have a thickness of 1.5 mm.

(4) Extrusion Moldability

The extrusion moldability was measured by evaluating sagging resistance, breaking resistance, and workability of a melt extruded sheet from die and roller of extruder. This was graded by the following criteria: ⊚=very good; ○=good; Δ=bad; x=very bad.

(5) Vicat Softening Temperature

The Vicat Softening Temperature was measured in accordance with ASTM D1525.

TABLE 1

|   |   | Examples |   |   |   |   |   |   |
|---|---|---|---|---|---|---|---|---|
|   |   | 1 | 2 | 3 | 4 | 5 | 6 | 7 |
| (A) Polycarbonate Resin | (A-1) | 84 | 84 | 84 | 84 | 84 | — | — |
|   | (A-2) | — | — | — | — | — | 84 | 84 |
| (B) Rubber Modified Vinyl-Grafted Copolymer | (B-1) | 8 | 6 | — | 8 | 8 | 8 | 8 |
|   | (B-2) | — | 2 | 4 | — | — | — | — |
| (C) Vinyl copolymer group | (C) | 8 | 8 | 12 | 8 | 8 | 8 | 8 |
|   | (C') | — | — | — | — | — | — | — |
| (D) Phosphorous compound | (D-1) | 16 | 16 | 16 | — | — | 16 | — |
|   | (D-2) | — | — | — | 14 | — | — | 14 |
|   | (D-3) | — | — | — | — | 9 | — | — |
| (E) Fluorinated Polyolefin Resin |   | 0.5 | 0.5 | 0.5 | 0.5 | 0.5 | 0.5 | 0.5 |
| Izod impact strength (¼", kgfcm/cm) |   | 45 | 50 | 38 | 50 | 55 | 41 | 46 |
| MI (250° C., 10 kg) |   | 23 | 17 | 13 | 14 | 7 | 18 | 14 |
| UL 94 (1.5 mm) |   | V-0 | V-0 | V-0 | V-0 | V-0 | V-0 | V-0 |
| Extrusion Moldability | sagging | ○ | ○ | ⊚ | ⊚ | ⊚ | ⊚ | ⊚ |
|   | breaking | ○ | ○ | ○ | ○ | ⊚ | ⊚ | ⊚ |
|   | workability | ○ | ⊚ | ⊚ | ⊚ | ⊚ | ⊚ | ⊚ |
|   | average | ○ | ○ | ⊚ | ⊚ | ⊚ | ⊚ | ⊚ |

TABLE 2

|   |   | Comparative Examples |   |   |   |   |   |   |
|---|---|---|---|---|---|---|---|---|
|   |   | 1 | 2 | 3 | 4 | 5 | 6 | 7 |
| (A) Polycarbonate Resin | (A-1) | 84 | 84 | — | — | — | — | — |
|   | (A-2) | — | — | 84 | 84 | 84 | 84 | 84 |
| (B) Rubber Modified Vinyl-Grafted Copolymer | (B-1) | 8 | 6 | 8 | 8 | 8 | 6 | 8 |
|   | (B-2) | — | 2 | — | — | — | 2 | — |
| (C) Vinyl copolymer group | (C) | — | — | — | — | — | — | — |
|   | (C') | 8 | 8 | 8 | 8 | 8 | 8 | 8 |
| (D) Phosphorous compound | (D-1) | 16 | 16 | 16 | — | — | 16 | 12 |
|   | (D-2) | — | — | — | 14 | — | — | — |
|   | (D-3) | — | — | — | — | 9 | — | — |
| (E) Fluorinated Polyolefin Resin |   | 0.5 | 0.5 | 0.5 | 0.5 | 0.5 | 0.5 | 0.5 |
| Izod impact strength (¼", kgfcm/cm) |   | 45 | 48 | 29 | 32 | 40 | 34 | 44 |
| MI (250° C., 10 kg) |   | 23 | 21 | 23 | 18 | 11 | 21 | 15 |
| UL 94 (1.5 mm) |   | V-0 | V-0 | V-0 | V-0 | V-0 | V-0 | V-2 (drip) |
| Extrusion Moldability | sagging | X | X | Δ | Δ | Δ | Δ | Δ |
|   | breaking | X | X | Δ | Δ | ○ | Δ | ○ |
|   | workability | X | X | X | Δ | Δ | Δ | Δ |
|   | average | X | X | Δ | Δ | ○ | Δ | ○ |

As shown in Tables 1 and 2, Comparative Examples 1 and 2 which employ linear polycarbonate and linear vinyl copolymer group show bad extrusion moldability due to low melt viscosity. Comparative Examples 3 and 6 which employ branched polycarbonate and linear vinyl copolymer group exhibit poor extrusion moldability and inferior impact strength. Comparative Example 7 which reduces the amount of flame retardant to increase the melt viscosity shows somewhat increased extrusion moldability, however, exhibits bad flame retardancy.

On the other hand, the resin compositions according to the present invention which comprise a polycarbonate resin, a rubber modified vinyl graft copolymer, a nonlinear vinyl copolymer group, a phosphorous compound, and a fluorinated polyolefin resin show not only excellent extrusion moldability but also good impact resistance and flame retardancy.

TABLE 3

|  |  | Examples | | |
|---|---|---|---|---|
|  |  | 8 | 9 | 10 |
| (A-1) Polycarbonate Resin | | 80 | 80 | 94 |
| (B) Rubber Modified Vinyl- | (B-1) | 10 | 10 | — |
| Grafted Copolymer | (B-2) | — | — | 3 |
| (C) Nonlinear Vinyl copolymer group | | 10 | 10 | 3 |
| (D) Phosphorous compound | (D-1) | 15 | 14 | 5 |
|  | (D-2) | 1 | 2 | 1 |
| (E) Fluorinated Polyolefin Resin | | 0.5 | 0.5 | 0.5 |
| UL 94 (1.5 mm) | | V-0 | V-0 | V-0 |
| Total burning time(sec) | | 22 | 19 | 25 |
| Izod impact strength (⅛", kgfcm/cm) | | 65 | 66 | 85 |
| Izod impact strength (after annealing) (⅛", kgfcm/cm) | | 55 | 54 | 73 |
| Vicat Softening Temperature(° C.) | | 100 | 100 | 126 |
| Extrusion Moldability | Sagging | ◯ | ◉ | ◉ |
|  | breaking | ◉ | ◉ | ◉ |
|  | workability | ◉ | ◉ | ◯ |
|  | Average | ◉ | ◉ | ◉ |

As shown above, the resin compositions of Examples 8-10 show excellent flame retardancy as well as heat and humidity resistance. Bisphenol-A based linear polycarbonate with a weight average molecular weight ($M_w$) of about 28,000 was used. The notch izod impact strength of Examples 8-10 was measured with the same manner as in Examples 1-7 except that the specimens having ⅛" thickness were used.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant polycarbonate thermoplastic resin composition comprising:

about 45 to about 95 parts by weight of a polycarbonate resin;

about 1 to about 50 parts by weight of a rubber modified vinyl graft copolymer;

about 1 to about 50 parts by weight of a nonlinear vinyl copolymer group, wherein the nonlinear vinyl copolymer group comprises a group of branched vinyl polymers or copolymers prepared by polymerizing a monomer mixture comprising styrene, α-methylstyrene, halogen- or alkyl-substituted styrene, $C_{1-8}$ methacrylic acid alkyl ester, $C_{1-8}$ acrylic acid alkyl ester, acrylonitrile, methacrylonitrile, maleic anhydride, $C_{1-4}$ alkyl- or phenyl N-substituted maleimide or a mixture thereof in the presence of polyfunctional compound;

about 1 to about 30 parts by weight of a phosphorous compound, with reference to 100 parts by weight of the combined weight of the polycarbonate resin, the rubber modified vinyl graft copolymer and the nonlinear vinyl copolymer group; and about 0.05 to about 5 parts by weight of a fluorinated polyolefin resin, with reference to 100 parts by weight of the combined weight of the polycarbonate resin, the rubber modified vinyl graft copolymer and the nonlinear vinyl copolymer group.

2. The flame retardant polycarbonate thermoplastic resin composition according to claim 1, wherein the rubber polymer is grafted with at least one monomer selected from the group of monomers consisting of styrene, α-methylstyrene, halogen- or alkyl-substituted styrene, $C_{1-8}$ methacrylic acid alkyl ester, $C_{1-8}$ acrylic acid alkyl ester and mixtures thereof, and at least one further monomer selected from the group of monomers consisting of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide and mixtures thereof.

3. The flame retardant polycarbonate resin composition according to claim 1 wherein the rubber polymer is selected from the group consisting of butadiene rubber, acryl rubber, ethylene-propylene rubber, styrene-butadiene rubber, acrylonitrile-butadiene rubber, isoprene rubber, terpolymer of ethylene-propylene-diene (EPDM), polyorganosiloxane-polyalkyl (meth)acrylate rubber complex and mixtures thereof.

4. The flame retardant polycarbonate thermoplastic resin composition according to claim 1, wherein the monomer mixture comprises about 50 to about 95 parts by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and about 5 to about 50 parts by weight of acrylonitrile, methacrylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide or a mixture thereof.

5. The flame retardant polycarbonate thermoplastic resin composition according to claim 1, wherein the polymerized polyfunctional compound is selected from the group consisting of a polyfunctional mercaptan, a polyfunctional vinyl benzene compound and mixtures thereof.

6. The flame retardant polycarbonate thermoplastic resin composition as defined in claim 1, wherein the nonlinear vinyl copolymer group has a weight average molecular weight ($M_w$) from about 200,000 to about 5,000,000.

7. The flame retardant polycarbonate thermoplastic resin composition according to claim 1, wherein the nonlinear vinyl copolymer group comprises a mixture of two or more nonlinear vinyl copolymers.

8. The flame retardant polycarbonate thermoplastic resin composition according to claim 5, wherein said polyfunctional mercaptan comprises about 0.01 to about 5 parts by weight with reference to 100 parts by weight of the monomer mixture.

9. The flame retardant polycarbonate thermoplastic resin composition according to claim 5, wherein the polyfunctional vinyl benzene compound comprises about 0.005 to about 5 parts by weight with reference to 100 parts by weight of the monomer mixture.

10. The flame retardant polycarbonate thermoplastic resin composition according to claim 1, wherein the phosphorous compound is selected from the group consisting of oligomeric phosphoric acid ester compounds derived from bisphenol-A represented by the following Formula (II), oligomeric phosphoric acid ester compounds derived from resorcinol represented by the following Formula (III), oligomeric phosphazene compounds represented by the following Formula (IV) and mixtures thereof:

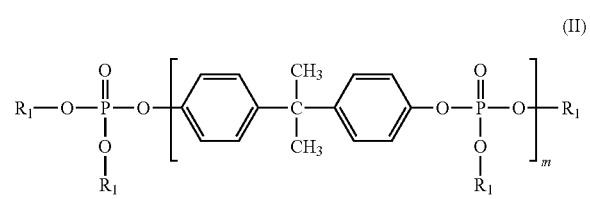
(II)

wherein $R_1$ is independently $C_{6-20}$ aryl group or an alkyl-substituted $C_{6-20}$ aryl group, m is an integer representing the number of repeating units of 1 to 5, and the average value of m in the mixture of the bisphenol A-derived oligomeric phosphoric acid ester is 1 to 3;

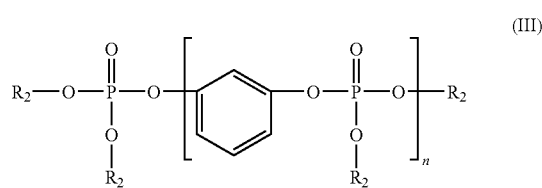
(III)

wherein $R_2$ is independently $C_{6-20}$ aryl group or an alkyl-substituted $C_{6-20}$ aryl group, n is an integer representing the number of repeating units of 1 to 5, and the average value of n in the mixture of the resorcinol-derived oligomeric phosphoric acid ester is 1 to 3; and

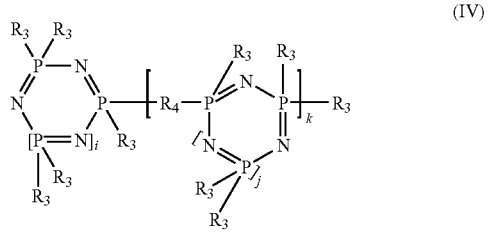
(IV)

wherein $R_3$ is alkyl, aryl, alkyl substituted aryl, arylakyl, alkoxy, aryloxy, amino, or hydroxyl; i and j are an integer from 0 to 10; $R_4$ is $C_{6-30}$ dioxyaryl or alkyl substituted $C_{6-30}$ dioxyaryl derivative; and k is a degree of polymerization and the average value of k is from 0.3 to 3.

11. The flame retardant polycarbonate thermoplastic resin composition according to claim 10, wherein the phosphorous compound is a mixture comprising about 5 to about 99 parts by weight of the bisphenol A-derived oligomeric phosphoric acid ester compound and about 1 to about 95 parts by weight of the resorcinol-derived oligomeric phosphoric acid ester compound.

12. The flame retardant polycarbonate thermoplastic resin composition according to claim 11, wherein the phosphorous compound is a mixture comprising about 10 to about 95 parts by weight of the bisphenol A-derived oligomeric phosphoric acid ester compound and about 5 to about 90 parts by weight of the resorcinol-derived oligomeric phosphoric acid ester compound.

13. The flame retardant polycarbonate thermoplastic resin composition according to claim 1, wherein the fluorinated polyolefin resin comprises resin particles having an average particle size of about 0.05 to about 1000 μm and a density of about 1.2 to about 2.3 $g/cm^3$.

14. The flame retardant polycarbonate thermoplastic resin composition according to claim 1, further comprising an additive selected from the group consisting of flame retardant aids, lubricants, releasing agents, nucleating agents, antistatic agents, stabilizers, impact modifiers, inorganic fillers, pigments, dyes and mixtures thereof.

15. A method of making a shaped thermoplastic resin composition, the method comprising:
providing a mass of the composition of claim 1; and
molding the mass into a molded article.

16. The method of claim 15, wherein providing a mass comprises:
providing about 45 to about 95 parts by weight of a polycarbonate resin;
providing about 1 to about 50 parts by weight of a rubber modified vinyl graft copolymer comprising a rubber polymer grafted with polymeric side chains;
providing about 1 to about 50 parts by weight of a nonlinear vinyl copolymer group;
providing about 1 to about 30 parts by weight of an phosphorous compound, with reference to 100 parts by weight of the combined weight of the polycarbonate resin, the rubber modified vinyl graft copolymer and the nonlinear vinyl copolymer group;
providing about 0.05 to about 5 parts by weight of a fluorinated polyolefin resin, with reference to 100 parts by weight of the combined weight of the polycarbonate resin, the rubber modified vinyl graft copolymer and the nonlinear vinyl copolymer group; and
mixing the polycarbonate resin, the rubber modified vinyl graft copolymer comprising a rubber polymer grafted with polymeric side chains, the nonlinear vinyl copolymer group, the phosphorous compound and the fluorinated polyolefin resin to form a mass.

17. A molded article comprising the flame retardant thermoplastic polycarbonate resin composition according to claim 1.

18. The molded article according to claim 17, wherein the molded article comprises at least a portion of an electronic device.

* * * * *